Aug. 5, 1952 D. K. HON, JR 2,605,913
CONVEYER SYSTEM FOR UNLOADING WAGONS
Filed Nov. 10, 1950 2 SHEETS—SHEET 1
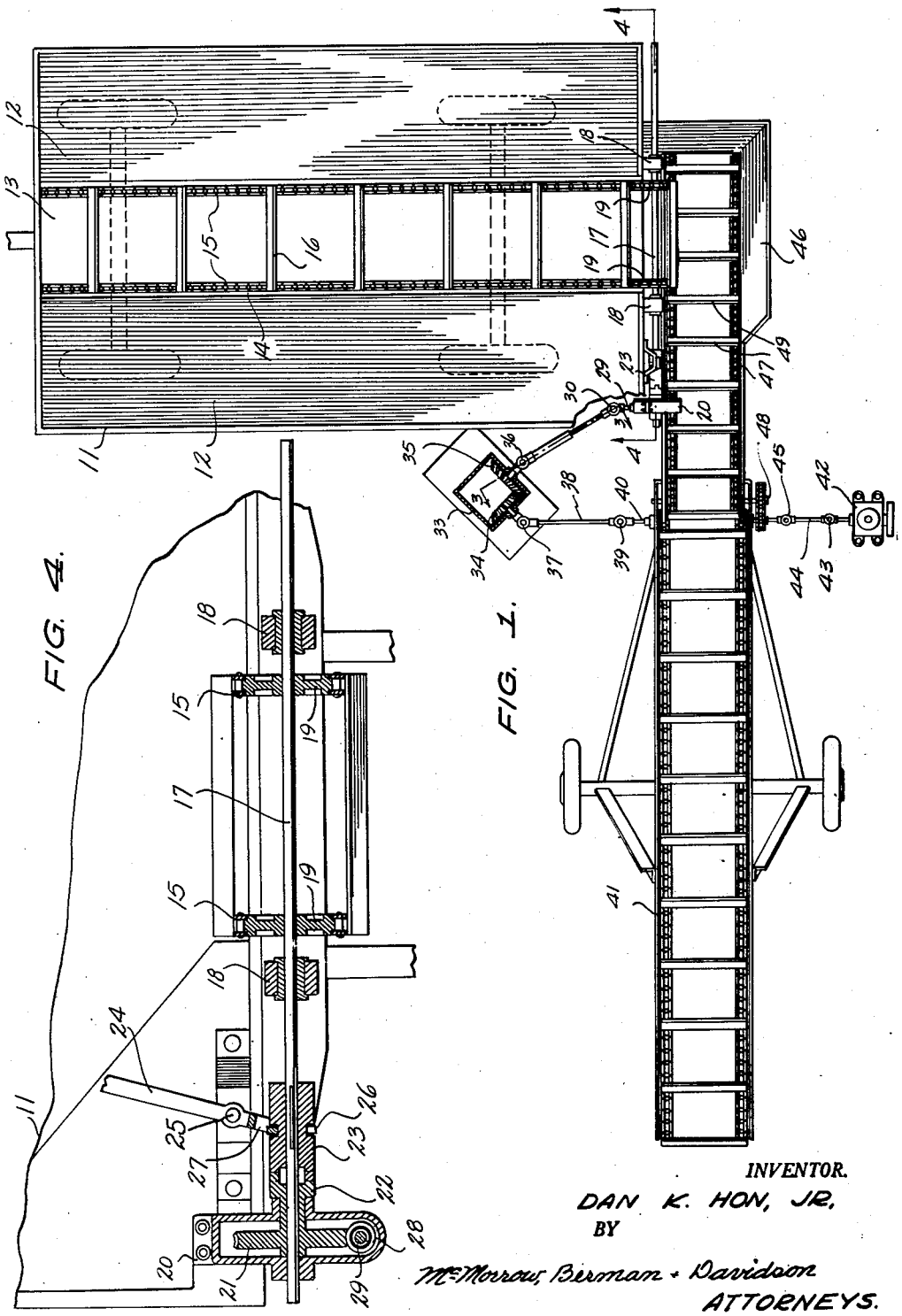
INVENTOR.
DAN K. HON, JR,
BY
McMorrow, Berman + Davidson
ATTORNEYS.

Aug. 5, 1952          D. K. HON, JR          2,605,913

CONVEYER SYSTEM FOR UNLOADING WAGONS

Filed Nov. 10, 1950          2 SHEETS—SHEET 2

INVENTOR.
DAN K. HON, JR.
BY
McMorrow, Berman & Davidson
ATTORNEYS.

Patented Aug. 5, 1952

2,605,913

UNITED STATES PATENT OFFICE 2,605,913

CONVEYER SYSTEM FOR UNLOADING WAGONS

Dan K. Hon, Jr., Paris, Ill.

Application November 10, 1950, Serial No. 195,034

1 Claim. (Cl. 214—44)

This invention relates to unloading apparatus, and more particularly to grain unloaders.

A main object of the invention is to provide a novel and improved unloading apparatus for grain and similar material, the apparatus being simple in construction, being easy to assemble, and providing an efficient and labor-saving means for unloading grain from a vehicle into an elevator.

A further object of the invention is to provide an improved unloading apparatus for grain and other similar material, said apparatus involving relatively inexpensive components, being very durable in construction, being easy to control, and providing a great saving in time and labor in unloading grain or similar material from a vehicle.

Further objects and advantages of the invention will become apparent from the following description and claim, and from the accompanying drawings, wherein:

Figure 1 is a top plan view of an improved unloading apparatus constructed in accordance with the present invention;

Figure 4 is an enlarged cross-sectional detail view taken on line 4—4 of Figure 1.

Figure 3:
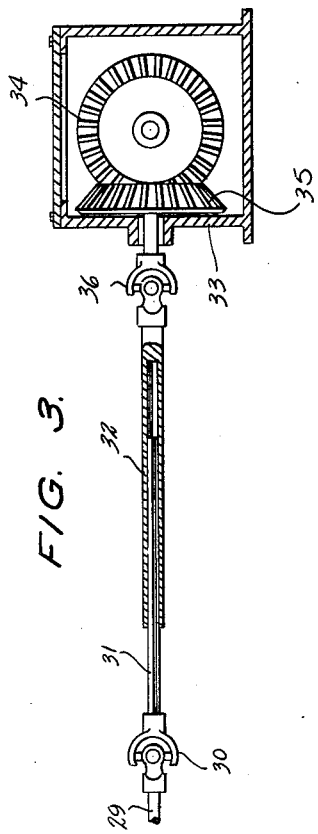
Figure 3 is an enlarged cross-sectional detail view taken on line 3—3 of Figure 1.
Figure 2:
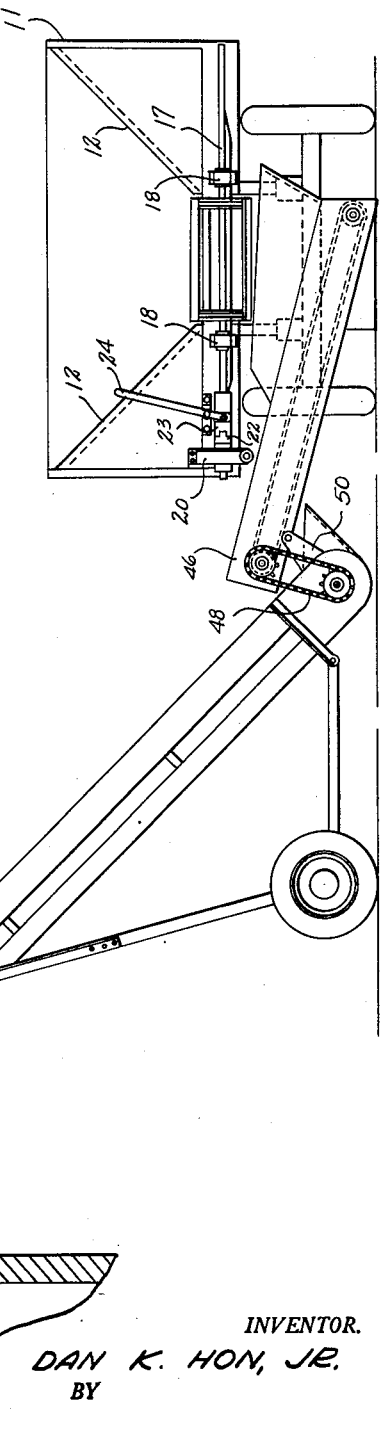
Figure 2 is a front elevational view of the apparatus shown in Figure 1.

Referring to the drawings, 11 designates a wagon having the sloping sides 12, 12 and the flat, relatively narrow, bottom wall 13. Designated at 14 is a belt conveyor comprising side chains 15, 15 connected by upstanding, transverse angle bars 16 spaced apart at uniform intervals, the chain members 15, 15 having their upper portions located above the bed 13 of the wagon and their lower portions located below said bed. At the ends of the wagon suitable supporting sprockets are provided for engaging and guiding the chains 15, 15. Designated at 17 is a transverse shaft provided at the rear end of the wagon 11 and supported in spaced bearings 18, 18, said shaft having the respective sprockets 19, 19 secured thereon. The chains 15, 15 pass over the sprockets 19, 19, as shown in Figures 1 and 4.

Secured to the side wall of the wagon 11 in alignment with the shaft 17 is the housing 20 through which the shaft 17 axially and rotatably extends, and rotatably mounted on said shaft in said housing is a worm gear 21 formed with an inwardly extending clutch sleeve 22 formed with spaced clutch teeth. Designated at 23 is a mating clutch sleeve splined on the shaft 17 for longitudinal sliding movement thereon, the sleeve 23 being formed with clutch teeth adapted to interengage with the clutch teeth of the sleeve 22. Designated at 24 is a lever pivoted at 25 to the wagon 11, and designated at 26 is an annular clutch ring engaged in an annular groove in the sleeve 23, said ring being pivotally connected to the arms of a depending yoke 27 secured to the lower end portion of the lever 24. It will be readily apparent that by rotating the lever 24 counterclockwise, as viewed in Figure 4, the sleeve 23 will be moved to the right and out of engagement with the clutch sleeve 22, whereby the shaft 17 will become uncoupled from the gear 21. Conversely, clockwise movement of the lever 24 moves the clutch sleeve 23 into interlocking engagement with the clutch sleeve 22 and couples the shaft 17 to gear 21.

Designated at 28 is a worm which is journaled longitudinally in the housing 20 and which meshes with the worm gear 21. Worm 28 is mounted on a shaft 29 which is connected by a universal joint 30 to a squared shaft 31 slidably received in a tubular shaft member 32 which has a squared bore in which shaft 31 is non-rotatively receivable. Designated at 33 is a housing which is located adjacent to wagon 11 in any desired position relative thereto, said housing having journaled therein the bevel gears 34 and 35 which are meshingly interengaged, as shown in Figures 1 and 3. Bevel gear 35 is pivotally connected to the tubular shaft 32 through a universal joint 36. Bevel gear 34 is pivotally connected by a universal joint 37 to a shaft 38 which in turn is pivotally connected by a universal joint 39 to the transverse drive shaft 40 of a conventional portable grain elevator 41. Designated at 42 is a suitable power unit, such as an internal combustion engine, an electric motor, or the like, the shaft of the power unit 42 being connected to the drive shaft 40 through universal joint 43, shaft section 44, and universal joint 45, as shown in Figure 1. The grain elevator 41 is provided with the hopper portion 46 which is disposed beneath the rear end of the conveyor belt carried on the wagon 11 in position to receive grain or other granular material discharged from the wagon by said conveyor belt. The hopper portion 46 has a short, upwardly and laterally inclined conveyor belt 47 which is driven by the shaft 40 through a sprocket chain 48 and suitable sprockets engaged thereby and mounted respectively on shaft 40 and on the end transverse shaft of the chain conveyor 47. The chain elements of conveyor 47 are connected by the uniformly spaced, transverse angle bars 49, similarly to the manner in which the angle bars 16 are connected to the chains 15, 15. The hopper section 46 is pivotally supported on upstanding brackets 50 carried by the lower end of the main conveyor section 51 of the grain elevator 41.

In operation, grain or other granular material in the wagon 11 is conveyed rearwardly by the endless belt conveyor of the wagon and is deposited into the hopper section 46 of the grain elevator. The material thus deposited is conveyed along the hopper section and is deposited into the receiving section of the main conveyor portion 51 of the grain elevator 41 and is then conveyed upwardly on the main portion of the grain elevator and is discharged at the top end of said main portion into the storage chamber, shown in fragmentary view at 52. It will be apparent that the chains 15, 15 on the wagon 11 are driven from the power unit 42 of the grain elevator through the shafts 40, 38, the universal joints 39, 37, the bevel gears 34, 35, the adjustable shaft elements 32, 31, the universal joints 36, 30, the worm 28, the worm gear 21, the clutch elements 22, 23 and the shaft 17. By providing the various universal joints 30, 36, 37 and 39, and the slidable shaft elements 31, 32, the elevator 41 may be oriented in any desired direction with respect to the wagon 11 over a wide range of different relative positions.

When the unloading operations have been completed, the belt conveyor of the wagon 11 and its driving connections may be removed and disconnected from the drive shaft 40 of the grain elevator, and the wagon may thereafter be employed as an ordinary farm wagon.

While a specific embodiment of an improved unloading apparatus for grain and similar material has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a separable driving linkage for a normally separated wagon and elevator each of which is provided with a conveyor and with a transverse drive shaft operatively connected to one end of each conveyor for driving the same, a worm gear adapted to be rotatably mounted upon the wagon drive shaft; a clutch element adapted to be mounted upon the wagon drive shaft and connected to the worm gear for rotation therewith; a manually controlled second clutch element mounted to slide upon the wagon drive shaft into and out of engagement with the first clutch element and adapted, under the control of an operator, to couple the worm gear with the wagon drive shaft in a driving relationship; a worm meshing with the worm gear; a jointed, extensible shaft connected to the worm for rotation therewith; a bevel gear secured to said extensible shaft for rotation therewith; a second bevel gear meshing with the first bevel gear; a jointed shaft adapted to be connected separably at one end to one end of the elevator drive shaft and connected at its other end to the second bevel gear for rotation therewith; and a source of motive power connected to the other end of said elevator drive shaft for joint operation of said elevator and wagon conveyors.

DAN K. HON, Jr.

REFERENCES CITED

The following references are of record in the file of this patent:

UNITED STATES PATENTS

| Number | Name | Date |
|---|---|---|
| 959,679 | Wunder | May 31, 1910 |
| 1,925,988 | Lower | Sept. 5, 1933 |
| 2,422,268 | Symonds | June 17, 1947 |